United States Patent [19]

Powell

[11] Patent Number: 4,964,435

[45] Date of Patent: Oct. 23, 1990

[54] SHUTTLE VALVE

[75] Inventor: Walter Powell, Sugarland, Tex.

[73] Assignee: Disco, Italy

[21] Appl. No.: 344,971

[22] Filed: Apr. 27, 1989

[30] Foreign Application Priority Data

Jan. 2, 1989 [EP] European Pat. Off. ............. 8910013

[51] Int. Cl.⁵ ............................. F16K 3/22; F16K 1/26
[52] U.S. Cl. ............................. 137/625.41; 137/625.44;
251/162
[58] Field of Search ..................... 137/625.44, 625.41;
251/162

[56] References Cited

U.S. PATENT DOCUMENTS 2,035,747  3/1936  Harris ............................ 137/625.44
2,530,295  11/1950  Fantz ............................ 137/625.44
3,176,720  4/1965  Donahue ......................... 137/625.44
3,180,362  4/1965  Muller .

FOREIGN PATENT DOCUMENTS 1199186  8/1965  Fed. Rep. of Germany .
3611911  10/1987  Fed. Rep. of
                  Germany ....................... 137/625.41
309793  4/1929  United Kingdom .
2167826  5/1986  United Kingdom .

Primary Examiner—Arnold Rosenthal
Attorney, Agent, or Firm—Lerner, David, Littenberg, Krumbolz & Mentlik

[57] ABSTRACT

Shuttle valves are disclosed including a housing with an inlet and two outlets and with a self-aligning valve therein which includes a seat for closing one of the outlets. The seat includes a valve disc with a spherical seating surface corresponding to the surface of the outlets, and the valve disc includes a stem which has an axes aligned with the radius of the spherical seating surface. The valve includes an actuator for selectively closing one of the outlets with the seat by moving the seat along a predetermined path between the two outlets and transversely to that path into seating engagement therewith.

19 Claims, 6 Drawing Sheets

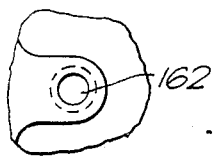
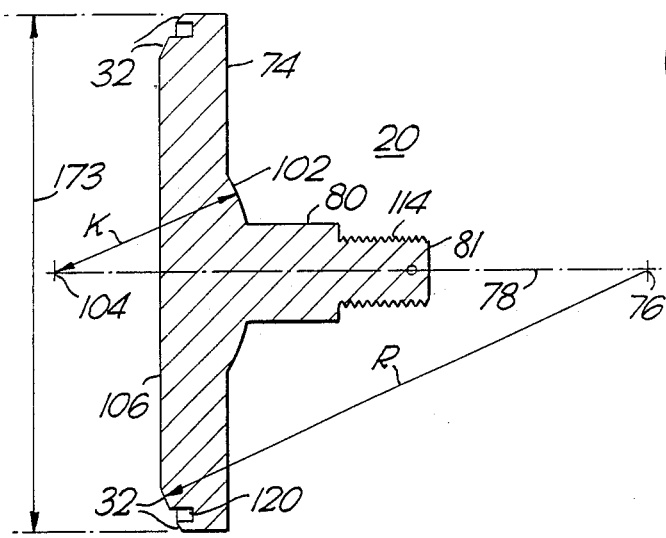
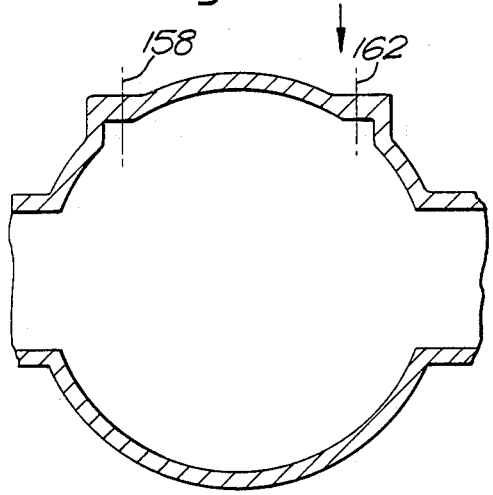

SHUTTLE VALVE

FIELD OF THE INVENTION

The invention relates to a shuttle valve, consisting of a valve housing with an inlet connecting piece (or an outlet connecting piece) and two outlet connecting pieces (or accordingly two inlet connecting pieces), these connecting pieces being in through-flow connection with one another, and a valve slide (or valve disc) arranged inside the valve housing and operable from outside by means of a rotary drive which alternatively creates the through-flow connection of the inlet connecting piece (outlet connecting piece) to one or other of the outlet connecting pieces (inlet connecting pieces).

BACKGROUND OF THE INVENTION

A shuttle valve of this type is already known; FIG. 1 shows such a known valve.

Such shuttle valves make possible the change-over of a conduit to one of two further conduits, the most frequently used being the combination with safety devices, as FIG. 16 renders schematically. There such a shuttle valve 10 is provided on a gas container 250 under pressure for example in order to produce alternatively a flow path to a first or a second safety valve 251, 252 in such a way that one valve is always ready to operate while the second serves as a stand-by valve. Behind the safety valves the flow branches can be joined again by means of a further shuttle valve 253 in order to create a single outlet 254 for the gas.

A shuttle valve should always be open in one direction and should hinder the flow of flow medium as little as possible. The latter is not the case in the embodiment illustrated in FIG. 1 in accordance with the prior art as a very sharp turn in the flow occurs which can lead to a considerable pressure drop as a result of high flow resistance. A further disadvantage is that if the known shuttle valve is not used properly the valve can also assume a permanent intermediate position in which flow medium can flow into both branches of the shuttle valve. This shuttle valve can then be used wrongly. Moreover it is inconvenient that in order to change over the shuttle valve according to FIG. 1 many turns of the handwheel illustrated there are necessary. This is not only time consuming but it also prevents a completely synchronous operation of several shuttle valves, e.g. the two shuttle valves 10, 253 illustrated in FIG. 16.

It should moreover be ensured that in both directions of flow the exact same conditions are present which is not necessarily the case in the embodiment according to FIG. 1 because of the asymmetrical construction of the slide 20 with regard to the two branches 16, 18.

The shuttle valve 10 is certainly described as having one inlet connecting piece and two outlet connecting pieces, however the direction of flow should on principle be able to be chosen freely. In the case of the second shuttle valve 253 according to FIG. 16 the direction of flow is such that both "outlet connecting pieces" serve as an inlet for flow medium while the "inlet connecting piece" serves to discharge the flow medium. "Inlet" and "outlet" are interchangeable in this respect.

FIG. 2 shows an improved construction vis a vis FIG. 1 by which, albeit in a rather complicated manner, is achieved, that the valve disc is rotatable axialsymmetrically with regard to the two branch conduits, moreover the actuation shaft is only to be twisted by 180 degrees, after a locking device has lifted the valve disc off the valve seat, whereupon the valve disc rotates by 180 degrees and then, through appropriate actuation of the locking device, is driven back on to the valve seat, this time of the other branch. This arrangement results in very costly treatment of inner parts for turning mechanisms. The assembly is also very expensive.

The aim of the invention is to improve the known shuttle valve so that there is only a very slight flow resistance and so that a change-over is possible when the spindle or shaft is turned by less than 360 degrees without a special locking device having to be actuated separately and that, without complicating the construction according to the prior art too much, a considerably simpler and safer, maloperation reducing construction is created which can also be operated by remote control if need be.

SUMMARY OF THE INVENTION

The aim is achieved through the valve disc being formed of a self-aligning partially spherical seating which can be pushed or pressed by means of an eccentric drive onto a valve seating also lying on a spherical surface. Through this type of eccentric drive in conjunction with a spherical surface it is possible to effect the change-over of the shuttle valve whereby the overall construction is axialsymmetrical with regard to the two branches and therefore not only are similar flow conditions present in both cases, the flow path for the flow medium being free from turbulence and therefore favourable to flowing, thus causing only a slight pressure drop inside the shuttle valve, but the mechanical treatment which results from it is also very simple.

Whereas in the prior art the valve housing with inlet connecting pieces and outlet connecting pieces is made up of several pieces and the treatment and assembly of the many parts is very expensive, it has been achieved according to the invention to make the housing from one piece, for example of steel castings or refined steel castings, because through the special construction it is unnecessary for the housing to be able to come apart for the purpose of assembling the inner parts—contrary to the prior art.

To this end it is particularly favourable if according to another embodiment the partially spherical seating is formed from the cap of a mushroom-shaped valve disc, the mushroom edge of which forms a first ring lying on a sphere (having a Radius R), whereby the midpoint of the sphere lies on the extended axis of the base of the mushroom beyond the end of the base, and if the valve disc is held by a valve disc lever situated on the attachment spindle of the rotary drive eccentrically to the axle of the actuating spindle in such a way that the midpoint of the sphere (apart from the eccentric movement) lies approximately on the axis of the actuating spindle.

In order to equalise the tolerances it is useful for a second ring lying on a sphere (having a Radius K) to be arranged at the transition between the base of the mushroom and the underside of the cap of the mushroom whereby the midpoint of the sphere lies on the extended axis of the base of the mushroom beyond the upper side of the cap of the mushroom and the valve disc lever forms a reception for the base of the mushroom of the valve disc which forms a bearing surface area which corresponds to the second ring and is also spherical. This construction permits the mushroom to align perfectly with Radius R so that the center line or axis of the mushroom perfectly matches Radius R in the valve body at a point corresponding to the axis of the actuating spindle. (See point 54 in FIG. 4 hereof.)

These measures permit a dismantling of the arrangement so that the component parts can be led through the housing openings which are present in any case and can then be assembled. A disassembly of the housing and therefore also an ability of the housing to be divided into several sections is therefore inessential.

It can then be useful for the partially spherical seating and/or the valve seatings to have an annular groove for receiving a packing ring while in many cases of application one is able to manage without such an additional annular groove with seals and packing ring.

In order to achieve the eccentric effect in as simple a way as possible an embodiment has been found in which the end of the actuating spindle carrying the eccentric forms a polygon, square, triangle, or any other indexing sleeve having an axis eccentric to the axis of the actuating spindle, on which is located a, preferably radially divided, drive bush with on the polygonal edges a corresponding bore and ring-shaped external shape for the rotatable, axially fixed reception of the same bearing ring of the valve disc lever.

A construction has proven itself to be particularly simple and safe in its construction in which both parts of the driving bush are at a distance from one another and press against the side surfaces of the bearing ring formed by the valve disc lever by the effect of an elastic force produced preferably by means of disc springs.

In general it will be favourable to choose the flow cross-sections of the inlet connecting piece and the outlet connecting pieces the same. In this case it is favourable if the inlet connecting piece forms an outward-pointing ring-shaped seating for a nozzle ring, wherein the inner edge of the ring-shaped seating forms the narrowest part of the inlet connecting piece and has a diameter which is (preferably only a little) greater than the outer diameter of the valve disc, and that the nozzle ring resting on the seating has an inner opening with a diameter which is smaller than the outer diameter of the valve disc and is preferably approximately the same as the inner diameter of the outlet connecting piece.

Between the nozzle ring and the ring-shaped seating a packing ring can be arranged and the nozzle ring can have a recess arranged on its perimeter for the formation of an outward pointing support shoulder onto which the clamping surfaces of the support means coming out from the inlet connecting piece (housing) grip like clamping screws. In this way the nozzle ring can be removed and can be exchanged for another for example or can also be taken out for the purpose of the disassembly or exchange or maintenance of the valve disc.

A particularly simple construction of the drive emerges when the actuating spindle is pivoted by 2 bushes arranged in a bore of the shuttle valve housing with sealing packing arranged in between whereby an end bracket is screwed into the housing which forms a radial and an axial pivot bearing for the outward pointing end of the actuating spindle and can be mounted on the pneumatic or electric actuating device operable by remote control.

If the housing is made of steel castings it can be useful to provide armoured refined steel on particular seatings, in particular on the spherical seating, which gives a better, in particular rust free sealing surface or assembly surface. If armouring by means of electrode welding is difficult for space reasons (in the case of a very, small housing) then the whole housing can be plated, e.g. nickel-plated. It is usually favourable to arrange the two outlet connecting pieces (as in the prior art) offset from one another by 180 degrees with regard to the axis of the inlet connecting piece or the actuating spindle. However the invention enables also if need be a different arrangement of for example 90/270 degrees.

BRIEF DESCRIPTION OF THE DRAWINGS

The invention is described in more detail with the help of the figures by means of a practical example.

FIG. 11 shows: an axial sectional view through the valve disc;

FIG. 12 shows: a side view through the housing of FIG. 4 along the intersecting line XII—XII on a reduced scale;

FIG. 13 shows: view B onto the projection of FIG. 12;

FIG. 14 shows: a sectional view as well as a top view onto the drive bush;

DETAILED DESCRIPTION

Figure 1:
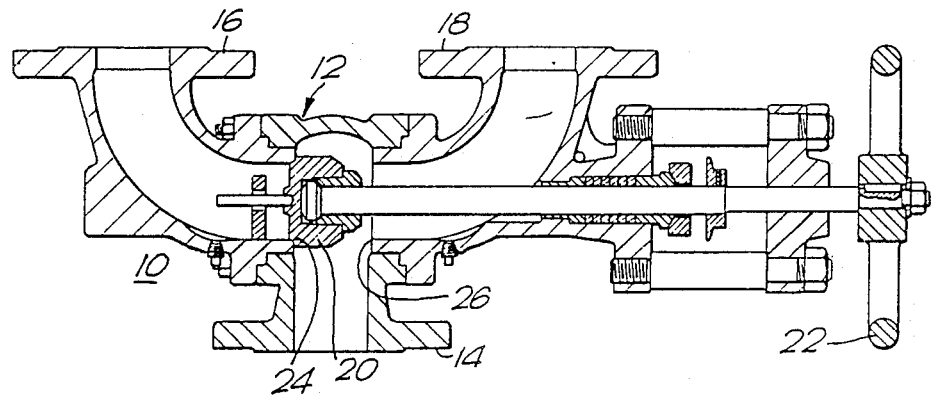
FIG. 1 shows: schematically in an axial section a known shuttle valve.

In FIG. 1 a shuttle valve 10 is illustrated consisting of a valve housing 12 with an inlet connecting piece 14 and two outlet connecting pieces 16, 18, these connecting pieces 14, 16, 18 being in through-flow connection depending on the position of a valve slide 20 arranged in the housing. The valve slide 20 can be actuated from the outside by means of a rotary drive, here in the form of a hand wheel 22, whereby the valve slide, which here is in the form of a piston 20, is pushed from the valve seating 24 connected with the outlet connecting piece 16 to the valve seating 26 connected with the outlet connecting piece 18.

Figure 2:
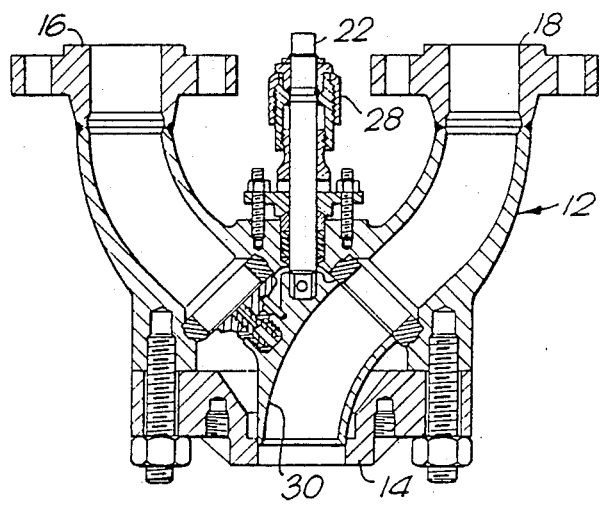
FIG. 2 shows: in a view similar to claim I a shuttle valve with already improved construction characteristics.
Figure 6:
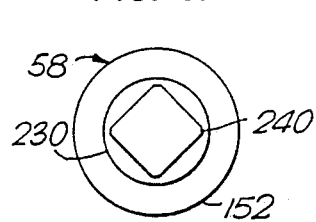
FIG. 6 shows: a view from above onto the spindle of FIG. 5.

In FIG. 2 a similar shuttle valve is illustrated with the difference that instead of a piston-like valve slide arrangement which can be pushed back and forwards a corresponding rotatable arrangement is provided which upon actuation of a locking device 28 (which has to be turned by 180 degrees) can be actuated so that via a spindle 22 a corresponding inner housing part 30 can also be rotated by 180 degrees and a flow channel can be transferred in such a way that the flow path is made, instead of from inlet connecting piece 14 to an outlet connecting piece 16, to the other outlet connecting piece 18.

It can be seen that the construction according to FIG. 2 is, with regard to the flow characteristics, considerably better than that of FIG. 1, the change-over can be completed moreover with only a single half turn, while in the piston slide valve according to FIG. 1 many turns are necessary, however the construction according to FIG. 2 is still very complicated (the housing is in several parts) and therefore it is expensive to manufacture.

Figure 3:
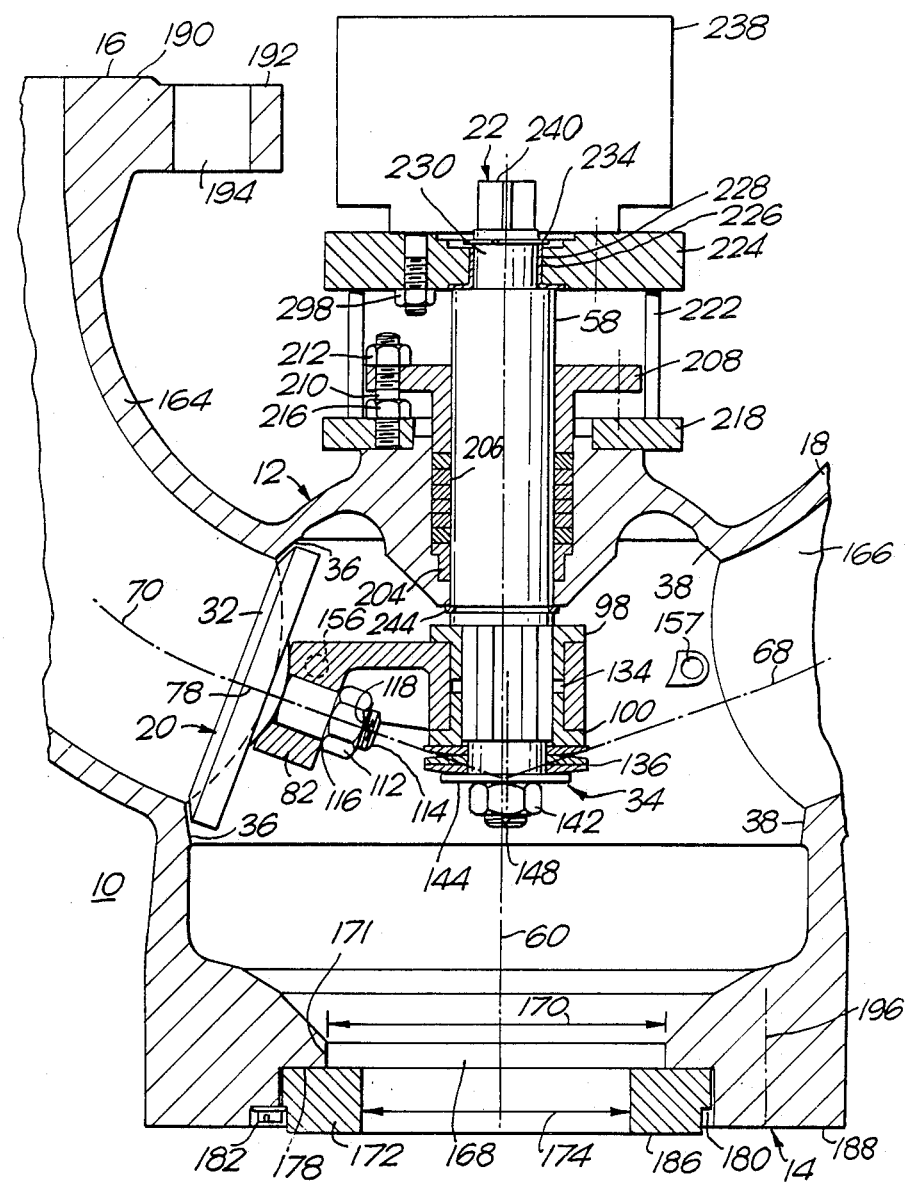
FIG. 3 shows: in an enlarged sectional view showing only the most important parts a shuttle valve in accordance with the practical example according to the invention.

These disadvantages are avoided in a construction as illustrated in detail in the axial section of FIG. 3. The basic structure is similar to that of the shuttle valve according to FIGS. 1 and 2 which has just been described in that a valve housing 12 is also present here with one inlet connecting piece 14 and two outlet connecting pieces 16, 18 (only illustrated in part), and a valve slide, or better valve disc 20 arranged inside the housing 10 and actuable from the outside by means of a rotary drive 22 is also provided which alternatively produces the through-flow connection from the inlet connecting piece 14 to one or other of the outlet connecting pieces 16 or 18. By contrast to the other two shuttle valves however the valve slide 20 or valve disc is formed in this instance from a partially spherical seating or spherical ring 32 which, by means of an eccentric drive 34, can be pushed or pressed onto valve seatings also having spherical seatings or spherical rings 36, 38.

Figure 4:
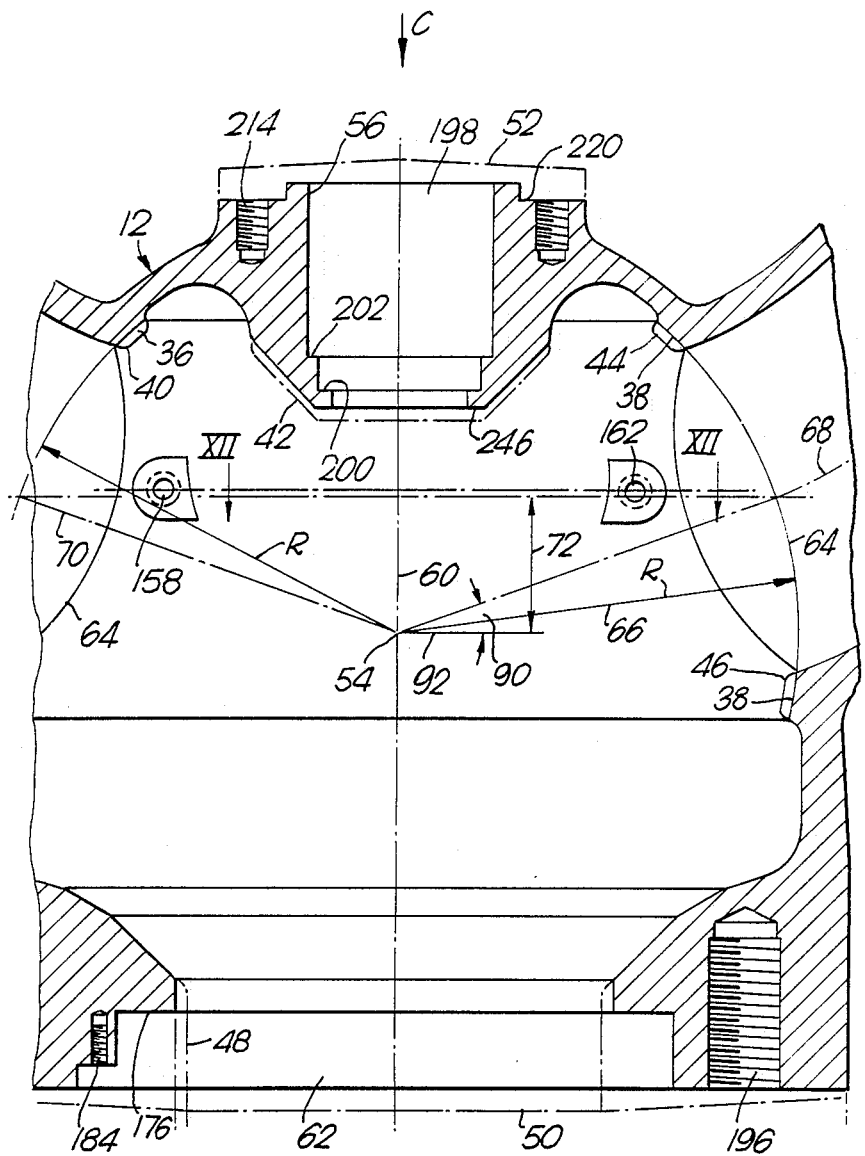
FIG. 4 shows: on a somewhat enlarged scale a section of a housing of the embodiment according to FIG. 3 omitting attachment parts.

As can be seen from FIG. 4, a somewhat enlarged illustration of the housing according to FIG. 3, the spherical ring areas 36, 38 for the valve seating are produced for example in this way that an appropriate-one-pieced housing 12 is first cast excessively at particular parts, see for example the dashed excess points 40, 44, 46 on the spherical ring seatings 36, 38 to be worked, and these points are then worked. The spherical ring surfaces are worked in such a way that they lie on a spherical seating, its midpoint being at 54, that is on the axis 60 of bore 56 for actuating spindle 58, see also FIG. 3.

The housing has a sufficiently large opening 62 on the lower end (on which the inlet connecting piece 14 emerges later) to be able to accommodate a tool which makes it possible to work the excess areas 40, 44, 46 so that a working surface results which lies on a sphere 64 with midpoint 54 and sphere radius 66. The midpoint of the sphere 54 lies far enough under the area of the bore 56 for there to be enough room left for the arrangement and movement of the appropriately formed valve disc 20 and moreover for the conduit opening directions 68 or 70 formed by the two valve seating 36 and 38 to have an upwards tendency, i.e. for the midpoint of the sphere 54 to lie a good bit, see reference no. 72, below the midpoints of the axes 68 and 70 in the area of the valve seatings 36, 38.

The valve disc 20 will now be gone into in more detail which can be seen in a sectional view in FIG. 11 and which has the form of a mushroom, with a cap 74, the upper edge of which is a spherical edge 32 lying on a sphere with midpoint 76. The radius of this sphere, R, corresponds exactly to the radius of the sphere with midpoint 54 inside the housing 12. The midpoint of this sphere, 76, lies on the extended axis 78 of the base of the mushroom 80, and even beyond the end of the base 81. As can be seen from FIG. 3, this mushroom-shaped valve disc 20 is held by a valve disc lever 82 in such a way that the sphere midpoint 76 of the valve disc 20 comes to rest on the sphere midpoint 54 of the housing 12 when the valve disc is situated on the sealing seating illustrated in FIG. 3.

Figure 8:
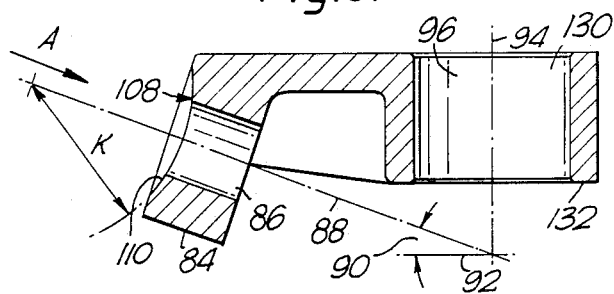
FIG. 8 shows: an axial sectional view onto the valve disc lever.
Figure 9:
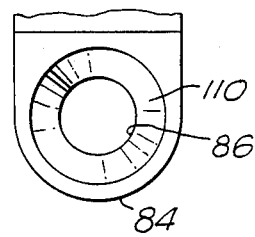
FIG. 9 shows: a view in the direction of the arrow A of FIG. 8.
Figure 10:
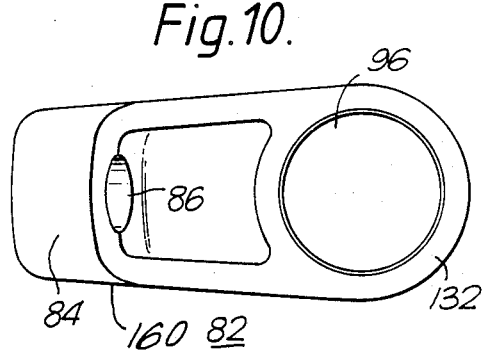
FIG. 10 shows: a view from above onto the object of FIG. 8.

The valve disc lever 82, (see detailed illustration in FIG. 8) (axial section view), FIG. 9 (view in direction A) and FIG. 10 (view from above) is constructed in such a way that it gives the valve disc 20 precisely this position in a quite definite end position of the spindle 58. To this end the valve disc lever 82 is provided with a valve disc base receiving head 84 with a bore 86 for receiving the base 80 of the valve disc, whereby the axis 88 of this aperture is at an angle to the plane 92 which is perpendicular to the axis 60 of the actuating spindle 58 and also to the axis 94 of a bore 96 with which the lever 82 is held on a bearing at the end of the spindle 58 formed from two drive bush parts. This angle 90 corresponds to the corresponding angle 90 in FIG. 4, formed again between the plane 92 and the line 68 or 70 running to the midpoint of the sphere which leads to the flow channel centre of the two branches.

Figure 15:
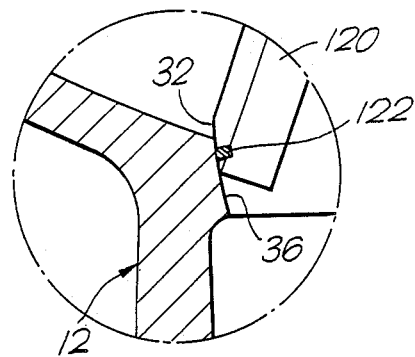
FIG. 15 shows: a detailed portrayal to illustrate a packing ring in the valve disc.

In order to achieve an exact construction of the spherical sealing edge 32 of the sealing disc 20 on either spherical valve seating 38 or 36, it is useful to provide a slight alignment possibility during the assembly of the valve disc 20 in the valve disc lever. To this end a further ring 102 lying on the spherical surface is provided at the transition between the base 80 and the underside of the cap 74 of the mushroom-shaped valve disc, whereby the midpoint of this spherical surface lies at 104 and on the extended axis 78 of the base of the mushroom beyond the upper side of the mushroom cap. Correspondingly the valve disc lever has a reception 108 which also forms a ring-shaped surface 110 lying on a spherical upper surface which has a radius of curvature K which corresponds exactly to the radius of curvature K of the spherical ring surface 102 of the valve disc 20, even if one has a concave and the other a convex spherical surface. Since the diameter of the base of the mushroom 80 is somewhat smaller than the diameter of the bore 86, there is some play. A spring washer is located between the nut 112 and the level 82 to prevent disc rattle during rotation. The valve disc 20 is secured in the valve disc lever 82 by screwing the nut 112 onto the end of the base 114 provided with a thread with the spring washer provided intermediately. The valve disc 20 is thus free to articulate on closing to perfectly coact with the body seats 32 and/or 38 The nut 112 can be tightened and then secured by the insertion of a safety pin 118. In order to obtain an even better sealing seating another annular groove 120 can be provided in the spherical ring surface 32, as can be seen in FIG. 11, for receiving a packing ring 122, see also FIG. 15.

It has already been mentioned that the valve disc lever 82 is held by two drive bushes 98, 100 of which one is illustrated in FIG. 14 in a sectional view and in a view from below. These drive bushes have a polygonal aperture 124, here in the form of a hexagon, corresponding to the corresponding polygonal outer form which the actuating spindle 58 according to FIG. 5 has near its lower end, see reference no. 126. For the assembly of the valve disc lever a drive bush 98 is inserted with its edge free end from above and a further drive bush 100 from below into the bore 96 of the lever 82, whereby the drive edges 128 rest on the end faces 130, 132 of the lever 82 as the two bushes 98, 100 only go into the bore 96 so far as still to leave a free space 134. The two bushes 98, 100 can then be pressed for example by means of disc springs 136 against a shoulder 138 which is formed at the end of the polygonal area 126 of the actuating spindle 58. The disc springs are for their part pushed onto a round, recoiling area 140 and held by means of a nut 142 (see FIG. 3) with an intermediate washer 144 screwed onto an end 146 of the spindle 58 provided with a thread and secured with a pin 148. Through the pressure of the disc springs a torque producing friction results between the bushes 98, 100 and the valve disc lever 82 squeezed in between them, but still rotatable against this friction.

Figure 7:
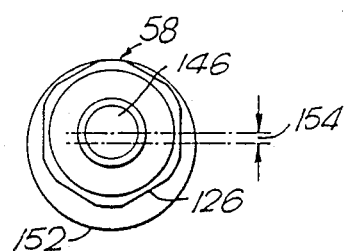
FIG. 7 shows: a view from below onto the spindle of FIG. 5.

The axis 150 of the polygon 126, of the area 140 and of the end 146 is offset by a measure 154 with regard to the axis 60 with which the spindle is pivoted in the housing 12, see reference No. 152, see also FIG. 7. Through this cambering or eccentricity, in the case of a constant turning position of the disc lever 82, a displacement perpendicular to the axis 60 or 154 is achieved which is twice the size of the offset 154.

If one turns, for example, via the square, illustrated in 22 in FIG. 3, the actuating spindle 58 for example in the clockwise direction, the valve disc 20, still freely movable for example in the housing 12, is moved into the projection plane by reason of the friction and the accompanying driving effect between the valve disc lever 82 and the drive bushes 98 and 100. As soon as the axis 78 of the valve disc 20 coincides with the axis 70 of the valve seat 36 the valve disc lever strikes an adjustable stop screw 156 which, held by a corresponding thread 158 in the housing 12, rests against the side surface 160 of the lever 82 aligning the latter and the valve disc 20 exactly, and secures the valve disc. If the spindle 58 is now turned further in the clockwise direction the drive bushes 98, 100 move against friction with regard to the lever 82 and provoke the movement of the latter, as a result of the eccentricity, towards the left in the direction of the valve seating 36. The arrangement should be such that shortly before the maximum deflection of the eccentric towards the left (seen according to FIG. 3) is reached, the valve disc contact surface 32 rests exactly on the housing valve seating 36. At this moment the closed end position for the locking of the left branch and the opening of the right branch is reached.

In order to change over the valve the spindle 58 is moved in the anti-clockwise direction whereby the valve disc 20 is first still securely fastened in its seating and thereby above all again by movement of the drive bushes 98, 100 driven by the spindle 58 is turned with respect to the end of valve disc lever 82 pivoted in these bushes, until through the eccentric movement which moves the disc 20 away from the housing 36, the disc 20 is released whereby it is freely movable in the housing 12 about the rotation axis 60 out of the reference plane by some 180 degrees again into the reference plane and then reaches a position which is determined by the stop of a stop screw 157. When the spindle 58 is turned further the disc 20 is pushed again onto the spherical ring-shaped seating 38 of the housing 12 until a sealed end position is reached.

The whole turning path of the spindle 58 will then be greater than 180 degrees but smaller than 360 degrees, the angle of rotation of 180 degrees being necessary for the free rotating movement of the valve disc 20, and the rotating movement of less than 90 degrees is used to effect a displacement of the valve disc 20 perpendicular to the axis 60 as a result of the cambering.

As the housing 12 should not be divided, on the other hand the valve disc 20 cannot according to its nature be led in through channels 164 or 166 (as otherwise no suitable seating ring surface 36 or 38 would result) the inlet channel 168 has a diameter 170 such as for the disc 20 to be able to pass through. That means that the diameter 170 is greater than the diameter 173 of the valve disc 20. In order on the other hand to make the resulting channel cross section for the inlet connecting piece with regard to the flow characteristics correspond to the corresponding channel cross sections of the two inlet connecting pieces 16, 18 a nozzle ring 172 is provided, the inner diameter 174 of which corresponds approximately to the inner diameter of the two channels 164 and 166. This nozzle ring 172 rests on a ring-shaped seating 176 whereby between the nozzle ring 172 and the seating 176 a packing ring 178 is arranged whereby the nozzle ring 172 has a recess arranged on the perimeter for the formation of an outward pointing support shoulder onto which the clamping surfaces of the holding means starting from the inlet connecting piece grip like cap screws 182. These cap screws are screwed into corresponding bores 184, of which for example six are distributed over the ring, see FIG. 4. The nozzle ring projects with its outward lying surface 186 slightly over the corresponding housing surface 188 and forms a connecting terminal area for the intermediate location of a joint packing ring, corresponding to the projecting area 190 with regard to the somewhat set back area 192 in the connections for example of outlet connecting piece 16, see the top left of FIG. 3. For the bolts which serve for flanging bores 194 are provided in the outlet connecting pieces, while in the inlet connecting piece corresponding blind tap holes 196 are provided, for example six distributed over the perimeter.

An aperture 198 serves for storing the actuating spindle 58 inside the housing, said aperture having shoulders 200 and 202 formed by diameter enlargements. A flanged bush 204 rests on these ring shoulders, said bush forming a pivot bearing for the spindle 58 and in their turn the contact surfaces for a seal packing 206 consisting for example of three pure graphite washers as well as on both outer surfaces thereof graphite impregnated cord, which packing washers are pressed together through a stuffing box gland 208, whilst being tightened by two bearing nuts 212 upon bolts 210. The bolts 210 are for their part screwed in corresponding blind screw taps 214 of the housing 12. These bolts hold with the help of a further nut 216 a lower ring 218 which can be placed on a corresponding recess surface 220 of the housing 12, onto which ring 218 two diaphragms 222 are welded (the whole thing can however also be a casting construction), onto which an upper ring 224 is welded and which has a central bore 226 with a ring bearing plate 228 which surrounds the shaft shoulder and forms a connection for the ring shoulder surface 232 so that the shaft cannot be moved upwards in the axial direction. A downwards movement (seen according to FIG. 3 or FIG. 5) is prevented by a safety ring 234 which is arranged in an annular groove 236 of the spindle 58. The ring 224 can moreover have a drive mechanism 238, for example an electromotive or a pneumatic drive, which acts on the square end 240 of the spindle 56.

There are here to some extent national standards, in Germany the standard DIN 3337 which determines the dimensions of the square 240 and the arrangement of the bores for joint connecting bolts 298.

Figure 5:
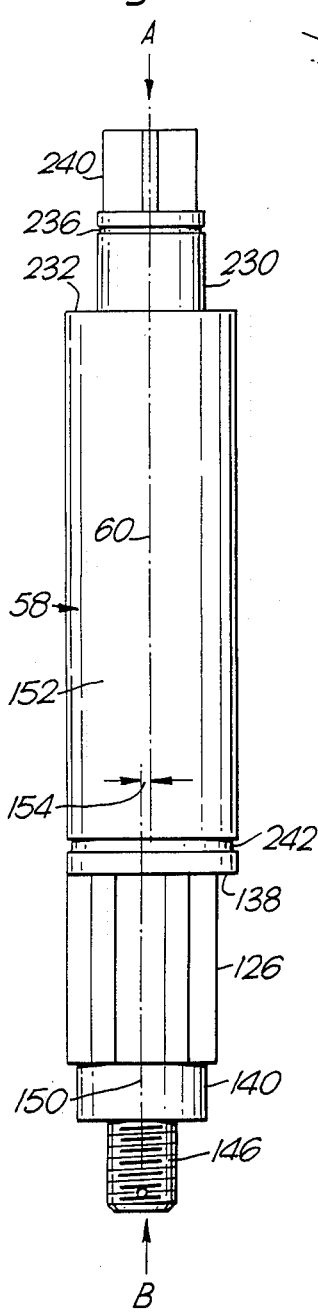
FIG. 5 shows: in a side view the driving spindle for the shuttle valve drive.

FIG. 5 shows a further annular groove 242 for receiving a spring washer 244 as an emergency stop on the inner surface 246 of the housing.

FIG. 12 shows a greatly reduced sectional view through the housing according to FIG. 4 for elucidation of the arrangement of the tap holes 158 and 162 for the stop screws 156 and 157.

Figure 16:
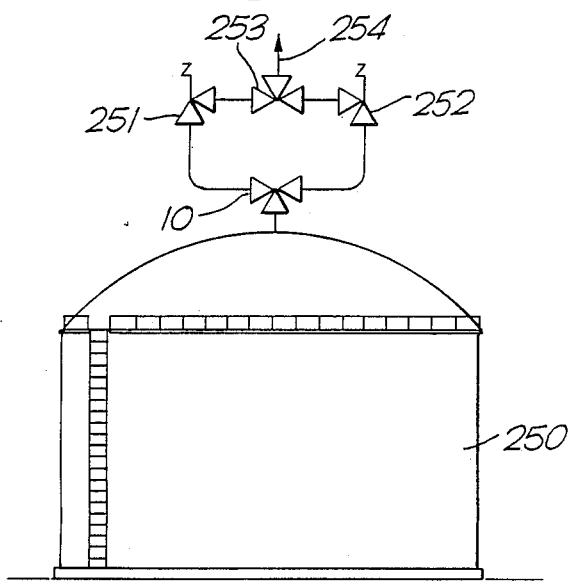
FIG. 16 shows: schematically an application for the shuttle valve according to the invention in conjunction with a second shuttle valve and two safety valves.

FIG. 16 shows the use of a shuttle valve according to the invention as dome ventilation of a large gas container 250, wherein two safety valves 251, 252 are connected at the outlet side of the shuttle valve 10 which for their part lead again into a shuttle valve 253 (in reversed arrangement), from which then an outlet connection 254 leads on.

If a motor drive 238 is provided actuation of the valve can take place when there is a fault quickly and without time-consuming mounting of the gas container 250 from a switchboard. Only later (for example in order to change the safety valve neutralised by the change-over) will someone climb up onto the gas container and perform the necessary work.

I claim:

1. A shuttle valve comprising a valve housing including a primary aperture and a pair of secondary apertures whereby a fluid can flow between said primary aperture and one of said pair of secondary apertures, self-aligning valve means within said housing, said self-aligning valve means including setting means for closing one of said pair of secondary apertures, said seating means comprising valve disc means including a valve disc seating surface defining a partial spherical surface and corresponding secondary aperture seating surfaces on each of said pair of secondary apertures defining corresponding partial spherical surfaces, said valve disc means comprising a disc face portion including a first surface including said valve disc seating surface and a second surface, and a transversely extending stem portion extending from a central portion of said second surface for a predetermined stem distance and having a stem axis, said valve disc seating surface having a radius whereby the center of a sphere defined by said partial spherical surface of said valve disc seating surface is aligned with said stem axis at a location beyond said predetermined stem distance, said second surface of said valve disc means including a partial spherical surface surrounding said stem portion and having a radius whereby the center of said sphere defining said partial spherical surface of said second surface of said valve disc means is aligned with said stem axis at a location facing said first surface of said valve disc means, and valve actuating means for selectively closing said one of said pair of secondary apertures with said seating means by moving said seating means between positions corresponding to said one of said pair of secondary apertures along a first predetermined path and for moving said seating means into seating engagement with said one of said pair of secondary apertures along one of a pair of second predetermined paths associated with said one of said pair of secondary apertures, said second predetermined path being substantially transverse to said first predetermined path, said valve actuating means comprising rotary drive means for rotatably moving said seating means along said first predetermined path, said first predetermined path comprising a generally circular path, said rotary drive means including longitudinally extending spindle means extending into said valve housing and having a spindle axis, and said seating means including valve disc lever means mounting said valve disc means eccentrically with respect to said spindle axis of said spindle means, said center of said sphere defining said partial spherical surface of said valve disc seating surface lying substantially on said spindle axis.

2. The shuttle valve of claim 1 wherein said valve disc lever means includes a stem aperture for receiving said stem portion of said valve disc means, said stem aperture being surrounded by a mating partial spherical surface corresponding to said partial spherical surface of said second surface of said valve disc means, whereby said valve disc means maintains its alignment with said corresponding secondary aperture seating surfaces.

3. A shuttle valve comprising a valve housing including a primary aperture and a pair of secondary apertures whereby a fluid can flow between said primary aperture and one of said pair of secondary apertures, self-aligning valve means within said housing, said self-aligning valve means including seating means for closing one of said pair of secondary apertures, said seating means comprising valve disc means including a valve disc seating surface defining a partial spherical surface and corresponding secondary aperture seating surfaces on each of said pair of secondary apertures defining corresponding partial spherical surfaces, said valve disc means comprising a disc face portion including a first surface including said valve disc seating surface and a second surface, and a transversely extending stem portion extending from a central portion of said second surface for a predetermined stem distance and having a stem axis, said valve disc seating surface having a radius whereby the center of a sphere defined by said partial spherical surface of said valve disc seating surface is aligned with said stem axis at a location beyond said predetermined stem distance, said second surface of said valve disc means including a partial spherical surface surrounding said stem portion and having a radius whereby the center of said sphere defining said partial spherical surface of said second surface of said valve disc means is aligned with said stem axis at a location facing said first surface of said valve disc means, and valve actuating means for selectively closing said one of said pair of secondary apertures with said seating means by moving said seating means between positions corresponding to said one of said pair of secondary apertures along a first predetermined path and for moving said seating means into seating engagement with said one of said pair of secondary apertures along one of a pair of second predetermined paths associated with said one of said pair of secondary apertures, said second predetermined path being substantially transverse to said first predetermined path, said spindle means including a mounting portion for mounting said valve disc lever means thereon, said mounting portion having a polygonal outer surface, said rotary drive means including an annular drive bush means having an inner surface corresponding to said polygonal outer surface of said mounting surface of said spindle means and having a circular outer surface, and said valve disc lever means including an annular bearing ring portion including a circular inner surface corresponding to said circular outer surface of said annular drive bush means whereby said valve disc lever means is rotatably mounted on said annular drive bush means.

4. The shuttle valve of claim 3 wherein said annular drive bush means includes axial fixing means for axially fixing the location of said valve disc level means with respect to said spindle means.

5. The shuttle valve of claim 4 wherein said axial fixing means comprises said annular drive bush means including a first annular drive bush member and a second annular drive bush member, each of said annular drive bush members including a body portion including said inner surface corresponding to said polygonal outer surface of said mounting portion of said spindle means and a flange portion extending transversely to said body portion, and said annular bearing ring portion of said valve disc lever means having a predetermined length, whereby said flange portions of said first and second annular drive bush members can enclose the ends of said annular bearing ring portion of said valve disc lever means.

6. The shuttle valve of claim 5 wherein said body portions of said annular drive bush members have a predetermined length which is less than said predetermined length of said valve disc lever means, whereby an annular space is provided therebetween.

7. The shuttle valve of claim 6 wherein said axial fixing means includes urging means for urging said first and second annular drive bush members towards each other.

8. The shuttle valve of claim 7 wherein said urging means comprises disc spring means.

9. A shuttle valve comprising a valve housing including a primary aperture and a pair of secondary apertures whereby a fluid can flow between said primary aperture and one of said pair of secondary apertures, self-aligning valve means within said housing, said self-aligning valve means including seating means for closing one of said pair of secondary apertures, said seating means comprising valve disc means including a valve disc seating surface defining a partial spherical surface and corresponding secondary aperture seating surfaces on each of said pair of secondary apertures defining corresponding partial spherical surfaces, said valve disc means comprising a disc face portion including a first surface including said valve disc seating surface and a second surface, and a transversely extending stem portion extending from a central portion of said second surface for a predetermined stem distance and having a stem axis, said valve disc seating surface having a radius whereby the center of a sphere defined by said partial spherical surface of said valve disc seating surface is aligned with said stem axis at a location beyond said predetermined stem distance, said second surface of said valve disc means including a partial spherical surface surrounding said stem portion and having a radius whereby the center of said sphere defining said partial spherical surface of said second surface of said valve disc means is aligned with said stem axis at a location facing said first surface of said valve disc means, and valve actuating means for selectively closing said one of said pair of secondary apertures with said seating means by moving said seating means between positions corresponding to said one of said pair of secondary apertures along a first predetermined path and for moving said seating means into seating engagement with said one of said pair of secondary apertures along one of a pair of second predetermined paths associated with said one of said pair of secondary apertures, said second predetermined path being substantially transverse to said first predetermined path, said primary aperture including an annular seating portion defining a primary aperture diameter corresponding to the minimum opening of said primary aperture, said annular seating portion being adapted to seat an annular nozzle member, said annular nozzle member having a predetermined inner diameter, said predetermined inner diameter of said annular nozzle member being less than said primary aperture diameter.

10. The shuttle valve of claim 9 wherein said disc face portion of said disc means has a disc diameter, said disc diameter being less than said primary aperture diameter and greater than said predetermined inner diameter of said annular nozzle member.

11. The shuttle valve of claim 10 wherein said pair of secondary apertures have corresponding secondary aperture diameters, wherein said inner diameter of said annular nozzle member substantially corresponds to said secondary aperture diameters.

12. The shuttle valve of claim 9 including a packing ring disposed between said annular seating portion of said primary aperture and said annular nozzle member.

13. The shuttle valve of claim 12 wherein said annular nozzle member includes an inner surface facing said primary aperture and an outer surface, said outer surface of said annular nozzle member including a recessed portion adapted for application of gripping means for holding said annular nozzle member in position on said valve housing.

14. The shuttle valve of claim 13 including gripping screw means projecting from said valve housing for gripping said recessed portion of said annular nozzle member and maintaining said annular nozzle member in position on said valve housing.

15. A shuttle valve comprising a valve housing including a primary aperture and a pair of secondary apertures whereby a fluid can flow between said primary aperture and one of said pair of secondary apertures, self-aligning valve means within said housing, said self-aligning valve means including seating means for closing one of said pair of secondary apertures, said seating means comprising valve disc means including a valve disc seating surface defining a partial spherical surface and corresponding secondary aperture seating surfaces on each of said pair of secondary apertures defining corresponding partial spherical surfaces, said valve disc means comprising a disc face portion including a first surface including said valve disc seating surface and a second surface, and a transversely extending stem portion extending from a central portion of said second surface for a predetermined stem distance and having a stem axis, said valve disc seating surface having a radius whereby the center of a sphere defined by said partial spherical surface of said valve disc seating surface is aligned with said stem axis at a location beyond said predetermined stem distance, said second surface of said valve disc means including a partial spherical surface surrounding said stem portion and having a radius whereby the center of said sphere defining said partial spherical surface of said second surface of said valve disc means is aligned with said stem axis at a location facing said first surface of said valve disc means, and valve actuating means for selectively closing said one of said pair of secondary apertures with said seating means by moving said seating means between positions corresponding to said one of said pair of secondary apertures along a first predetermined path and for moving said seating means into seating engagement with said one of said pair of secondary apertures along one of a pair of second predetermined paths associated with said one of said pair of secondary apertures, said second predetermined path being substantially transverse to said first predetermined path, said valve actuating means comprising rotary drive means for rotatably moving said seating means along said first predetermined path, said first predetermined path comprising a generally circular path, said rotary drive means including longitudinally extending spindle means extending into said valve housing and having a spindle axis, and said seating means including valve disc lever means mounting said valve disc means eccentrically with respect to said spindle axis of said spindle means, said center of said sphere defining said partial spherical surface of said valve disc seating surface lying substantially on said spindle axis, said valve housing including a spindle aperture and said spindle means projecting into said valve housing through said spindle aperture, and including first and second annular spindle bushing members disposed within said spindle aperture and surrounding said spindle means for providing a pivot bearing for said spindle means, said first and second annular spindle bushing members being longitudinally displaced along said spindle means.

16. The shuttle valve of claim 15 including an annular packing material surrounding said spindle means and disposed between said displaced first and second annular spindle bushing members.

17. The shuttle valve of claim 16 including spindle retention means for retaining said spindle member within said spindle aperture.

18. The shuttle valve of claim 17 wherein said spindle means includes a first end and a second end, said first end of said spindle means projecting into said valve housing and said second end of said spindle means projecting outwardly from said valve housing and including a radial shoulder portion, and wherein said spindle retention means comprises bracket means for abutting said radial shoulder portion of said second end of said spindle means to retain said spindle means within said spindle aperture.

19. The shuttle valve of claim 18 wherein said spindle means includes annular groove means and including annular ring means in said annular groove means for retaining said spindle means in a predetermined longitudinal location within said spindle aperture.

* * * * *